(12) United States Patent
Lauer

(10) Patent No.: US 7,586,086 B2
(45) Date of Patent: Sep. 8, 2009

(54) SCANNING IMAGING DEVICE FOR IMAGE-SUBSTRACTION CONFOCAL MICROSCOPY

(76) Inventor: Vincent Lauer, 1 villa de Beauté, Nogent sur Marne (FR) 94130

( * ) Notice: Subject to any disclaimer, the term of this patent is extended or adjusted under 35 U.S.C. 154(b) by 77 days.

(21) Appl. No.: 10/563,738

(22) PCT Filed: Jul. 2, 2004

(86) PCT No.: PCT/FR2004/001733

§ 371 (c)(1),
(2), (4) Date: Jul. 10, 2006

(87) PCT Pub. No.: WO2005/006050

PCT Pub. Date: Jan. 20, 2005

(65) Prior Publication Data

US 2007/0041089 A1    Feb. 22, 2007

(30) Foreign Application Priority Data

Jul. 4, 2003  (FR) .................................. 03 08243
Jul. 29, 2003 (FR) .................................. 03 09361

(51) Int. Cl.
*H01J 3/14*   (2006.01)
(52) U.S. Cl. .................. 250/234; 250/235; 250/237 R; 250/208.1; 359/368

(58) Field of Classification Search ............. 250/208.1, 250/234, 235, 237 R, 237 M; 359/368, 385; 382/108, 254
See application file for complete search history.

(56) References Cited

U.S. PATENT DOCUMENTS

| 6,144,489 | A | 11/2000 | Wilson |
| 6,341,035 | B1 * | 1/2002 | Miura et al. ................. 359/363 |
| 6,426,835 | B1 | 7/2002 | Endo |
| 6,545,265 | B1 | 4/2003 | Muehlig |
| 6,687,052 | B1 | 2/2004 | Wilson |
| 6,841,780 | B2 * | 1/2005 | Cofer et al. ............... 250/341.1 |
| 2002/0176605 | A1 * | 11/2002 | Stafsudd et al. ............. 382/106 |

FOREIGN PATENT DOCUMENTS

JP          09309402 A  *  12/1997

OTHER PUBLICATIONS

T. Wilson and D. Hamilton, Difference confocal scanning microscopy, Optica Acta, 1984, vol. 31, No. 4, 453-465.

* cited by examiner

*Primary Examiner*—Stephen Yam
(74) *Attorney, Agent, or Firm*—North Oaks Patent Agency; Shawn B Dempster

(57) ABSTRACT

The invention relates to an imaging device comprising means for generating two images which are filtered differently by a mask (304) and for combining same.

19 Claims, 18 Drawing Sheets

SCANNING IMAGING DEVICE FOR IMAGE-SUBSTRACTION CONFOCAL MICROSCOPY

TECHNICAL FIELD

The invention relates to a scanning imaging system which can be used for example in microscopy and is similar to a confocal microscope.

PRIOR ART

Patent U.S. Pat. No. 6,144,489 describes the extraction of the confocal part of a semi-confocal image, obtained by subtracting a non-confocal image from the confocal image.

Patent U.S. Pat. No. 6,426,835 describes a particular case of the first patent, specifying the details of the calculation to be carried out.

Patent U.S. Pat. No. 6,545,265 describes the improvement of confocal images by subtracting from one another two confocal images obtained from arrays of microscopic holes having different characteristics. In this patent, the two images may be obtained from selected light coming from disks or from rings in an observed plane. However, the images remain confocal in the sense that the illuminated zone always coincides with the zone from where the selected light comes.

Patent U.S. Pat. No. 6,687,052 describes a technique for subtracting two images from one another, one of said images being semi-confocal and the other being obtained from the light that is not used to generate the semi-confocal image. In this patent, a mask is used to filter the light coming from the observed object. This mask comprises transparent parts and reflective parts. The light transmitted by the mask is used to generate a first image. The light reflected in the opposite direction by the mask is used to generate a second image.

DESCRIPTION OF THE INVENTION

The object of the invention is to improve the quality and the luminosity of confocal or semi-confocal images, and in particular of images obtained in fluorescence.

To this end, the invention consists of an imaging device comprising:

a) a means for illuminating at least one illumination point on an observed zone by means of an illumination light beam, b) a means for selecting the light coming from said illumination point, c) a means for forming an image of said illumination point from the selected light coming from said illumination point, d) a scanning system for displacing said illumination point on the observed zone and for simultaneously displacing the image of said illumination point, in order to scan an observed zone and form a first image of the observed zone, e) a sensor which detects the first image, characterized in that:

f) it comprises a means for selecting the light coming from a band surrounding said illumination point, g) it comprises a means for forming an image of said band from the selected light coming from said band, h) the scanning system is arranged so as to simultaneously displace said illumination point and the image of said band, in order to form a second image of the observed zone from the selected light coming from said band, i) it comprises a sensor which detects the second image, j) it comprises a means for combining the first and second images of the observed zone to form a third image of the observed zone.

Preferably, said bands are rings that are concentric to said illumination points. However, the bands may be of any shape, for example square or hexagonal, without calling into question the principle of the invention.

The device differs from the prior art (U.S. Pat. No. 5,545,265) in that the second image is formed from the light coming from a ring (or from a band) surrounding the illumination point. In patent U.S. Pat. No. 5,545,265:

either the illumination is focused on a point and the light coming from the illumination point is selected to form the image, the first and the second image differing from one another by the size of the illumination point, or the light coming from a ring is selected to form the second image, but in this case the illumination is also modified between the first and the second image so that a ring is illuminated during acquisition of the second image, this ring coinciding with the one from which the selected light comes in order to form the second image.

According to the invention, the image is thus obtained by suppressing the light coming from the illumination zone (since it is blocked by the center of the ring) instead of selecting it. As a result, when an object is in the observed plane, the first image is of high luminosity and the second image is of zero luminosity. Therefore, the difference between the two images is equal to the first image, of high luminosity. When an object is far away from the observed plane, and given a suitable size of the ring, the two images are of comparable luminosity and the difference between the two images is therefore of zero luminosity. It will be noted therefore that the difference between the two images makes it possible to retain only the image of the observed plane and to eliminate everything which comes from distant planes.

Rather than selecting the lighting coming from a ring, it would be possible for the second image to retain all of the non-illuminated zone, as in U.S. Pat. No. 6,687,052. However, in this case, and due to the fact that only a reduced set of points is illuminated, the luminosity of the second image would be much higher than the luminosity of the first image, which disturbs the sensors. The use of a ring also makes it possible to optimize the vertical and horizontal resolution of the image and to provide better rejection of the light not coming from the observed plane.

If the light coming from a ring had been selected for the second image, but by using for this second image an illumination which is also annular and by illuminating the ring from which the selected light comes, as in the case of U.S. Pat. No. 5,545,265, the characteristics of the resulting image (third image) would not have been markedly improved.

According to the invention, said means for combining said first and second images determine the difference between the first image modified by a first multiplier coefficient and the second image modified by a second multiplier coefficient. The multiplier coefficients make it possible to adapt to the precise imaging conditions. The resultant image may optionally then be adjusted in terms of level and contrast so as in particular to suppress any negative values before display.

The device may comprise a plurality of illumination points and a plurality of bands, each of said bands surrounding a corresponding illumination point. This is the case of a multipoint system. In this case, the most immediate advantage of the system compared to a simple multipoint confocal is very good rejection of the light coming from points which are not in the observed plane.

In this case, the means for illuminating the set of illumination points preferably comprises an array of microlenses which separate a laser beam into a plurality of subbeams, each focused on one illumination point. Compared to methods using coherent light, this makes it possible to obtain a more intense illumination.

The device may also comprise just a single illumination point obtained for example by a lens which focuses a laser beam on the illumination point. In this case, the most immediate advantage over a single-point confocal microscope is the improvement in the vertical and horizontal resolution.

The first and the second image may be formed successively or simultaneously.

According to a version of the invention which is adapted to the case where the first and the second image are formed successively, the means for selecting the light consist of the superposition of a first opaque plate comprising at least one transparent disk and of a second opaque plate comprising at least one transparent disk and at least one transparent ring, as well as a means for moving the second plate in translation with respect to the first, so as to bring the disk of the second plate opposite the disk of the first plate during acquisition of the first image and so as to then bring the ring of the second plate opposite the disk of the first plate during acquisition of the second image. The superposition of the two plates is therefore equivalent to a transparent disk during acquisition of the first image and to a transparent ring during acquisition of the second image. During acquisition of the first image, the disk must coincide with the image of the illumination point on the plate in order for the latter to have the function of selecting the light coming from the illumination point. During acquisition of the second image, the ring surrounds the illumination point.

According to a version of the invention which is adapted to the case where the two images are acquired successively:
  the means for selecting the light comprise a mask composed of transparent or reflective microprisms which make it possible to send in a first direction the light coming from the illumination points and constituting a first beam and to send in a second direction the light coming from the set of bands and constituting a second beam,
  the device comprises a means for forming the first image from the first beam,
  the device comprises a means for forming the second image from the second beam.

This version of the invention is particularly suitable for rapid imaging.

This rapid imaging technique can be generalized to image acquisition systems which do not necessarily use a set of illumination points but which may for example use parallel illumination bands.

According to a different aspect of the invention, which is generalized in this sense, the invention consists of an optical microscopy system comprising:
  a means for illuminating an illumination zone in an observed plane of an observed object and for displacing the illumination zone in the observed plane, in order to scan an observed zone,
  a mask which divides the light coming from the observed plane into a first beam coming from the illumination zone and a second beam coming from a secondary detection zone,
  a means for forming a first image from the first beam,
  a means for forming a second image from the second beam,
  a means for combining the first and the second image to form a third image, characterized in that said mask is composed of transmissive or reflective microprisms which make it possible to send in a first direction the light coming from the illumination zone and constituting a first beam and to send in a second direction the light coming from the secondary detection zone and constituting a second beam.

Compared to the prior art described in U.S. Pat. No. 6,687,052, the use of microprisms instead of a reflective mask considerably simplifies the acquisition of the two images, due to the fact that the first and the second beam are sent not in opposite directions but rather in directions which are slightly different.

In order to separate the two beams which have slightly different directions, the system preferably comprises:
  an intermediate lens for sending the first and the second beam into a separation zone where they are spatially separated,
  at least one prism or one mirror which is placed in the separation zone, in order to modify the direction of at least one of the first and second beams.

In order to allow the acquisition of the two images on the same camera, the system may comprise a lens which is simultaneously passed through by the first and the second beam after the separation zone, and which forms the first and the second image in two distinct zones of the same image plane.

In order to simplify the illumination of the object by using, to generate an illumination figure, the same microprism mask as used to separate the first and second beam, the system preferably comprises:
  a first aperture diaphragm which is passed through by the illumination light beam before it reaches the mask composed of transparent or reflective microprisms,
  a second aperture diaphragm which is passed through by the illumination light beam coming from the mask and directed toward the observed object, and the first aperture diaphragm is positioned such that the part of the illumination beam which reaches a zone of the mask which transmits said second beam is then stopped by the second aperture diaphragm, and such that the part of the illumination beam which reaches a zone of the mask which transmits said first beam then passes through the second aperture diaphragm.

According to a version of the invention which is adapted to incoherent illumination, the illumination zone consists of a set of parallel bands, and, in that the secondary detection zone consists of a set of bands alternating with the bands of the illumination zone.

According to a version of the invention which is adapted to coherent illumination, the illumination zone consists of a set of points, and in that the secondary detection zone consists of a set of bands surrounding each of the points of the illumination zone.

The method for successive acquisition of the images can also be generalized; according to one aspect of the invention, which is generalized in this sense, the invention consists of an optical microscopy system comprising:
  a) a means for illuminating an illumination zone on the observed object, by means of an illumination beam,
  b) a means for selecting the light coming from a detection zone and constituting a beam to be detected,
  c) a means for forming in an image plane an image of the observed object from the beam to be detected,
  d) a scanning device for displacing the illumination zone in order to scan the whole of the observed zone and in order to simultaneously displace the image of the illumination zone in the image plane, e) a sensor arranged in the image plane, for successively detecting a first image of the observed object and then a second image of the observed object, f) a means for combining the first and the second image in order to obtain an improved image, characterized in that:

it comprises a mask arranged on the path of the beam to be detected or on the path of the illumination beam, delimiting the illumination zone or the detection zone and reached by just one of either the beam to be detected or the illumination beam, it comprises a means for modifying the features of this mask between the acquisition of the first image and the acquisition of the second image, so as to modify the detection zone while leaving the illumination zone unchanged or so as to modify the illumination zone while leaving the detection zone unchanged.

The mask comprises for example an alternating arrangement of bands, and the modifying means is then a means for displacing the mask in a direction that is not parallel to said bands.

As mentioned above, the mask may consist of the superposition of a first array of disks and of a second array comprising disks and rings, the means for modifying the features of the mask consisting of a means for moving the second array in translation with respect to the first array, so that the disks of the first array alternately select the rings or the disks of the second array.

FIRST EMBODIMENT

Figure 1:
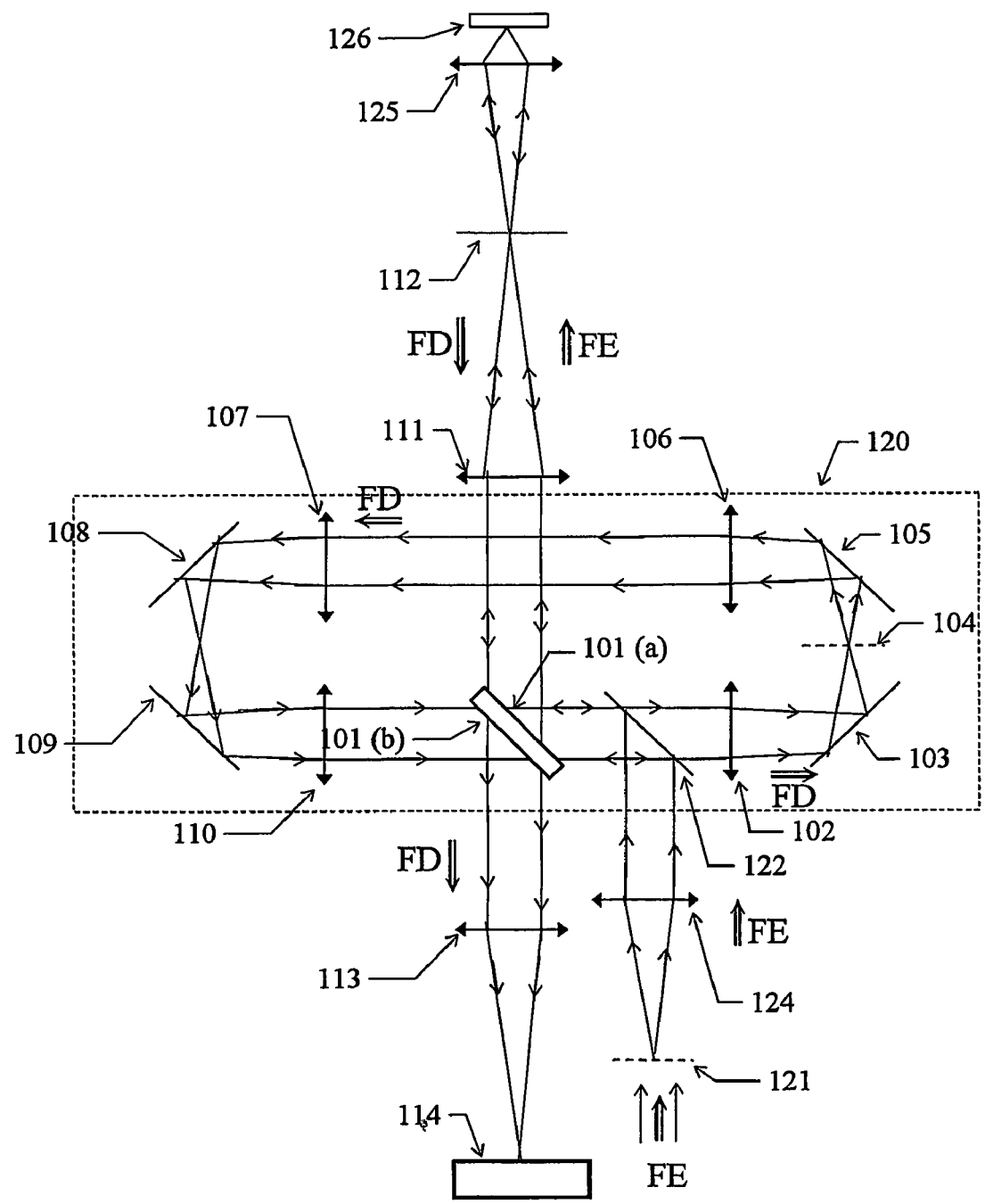
FIG. 1 shows the scanning system used in a first embodiment of the invention.

This first embodiment is shown in FIG. 1.

An illumination beam FE coming from an arc lamp equipped with a condenser passes through a mask 121. The figure shows the part of the beam FE which comes from one point of the mask 121. The illumination beam FE then passes through a lens 124, a focal plane of which is on the mask 121. It is then sent by the dichroic mirror 122 toward the galvanometric mirror 101 and then toward the lens 111. The galvanometric mirror is in a focal plane of the lens 124 and in a focal plane of the lens 111. After having passed through the lens 111, the illumination beam then reaches an intermediate image plane 112 and then is focused by a microscope objective 125 onto an observed plane of an observed object 126, illuminating an illumination zone which is therefore the image of the transparent parts of the mask 121. Advantageously, instead of a microscope objective 125 with a finite distance, it is possible to use an infinite distance objective coupled to a tube lens. The observed object re-transmits, by fluorescence, a beam FD having a wavelength different from the incident wavelength.

The illumination beam FD coming from the observed object 126 and collected by the objective 125 passes through the intermediate image plane 112 and then the lens 111, a focal plane of which is the plane 112. The figure shows the part of the beam FD coming from a particular point of the observed object illuminated by the part of the beam FE coming from a point of the mask 121, which is also shown. After having passed through the lens 111, the beam FD is in an afocal zone, that is to say that the beam coming from a given point on the plane 112 becomes parallel after having passed through the lens 111. The beam then reaches the scanning and compensation assembly 120, the input and output of which are in the afocal zone. The first element encountered by the beam in the scanning device is the object face 101(a) of the galvanometric mirror located in a focal plane of the lens 111. This face of the galvanometric mirror reflects the beam toward the lens 102, a focal plane of which is on the face 101(a) of the galvanometric mirror. After having passed through the lens 102, the beam reaches the mirror 103 which reflects the beam toward a mask 104 located in a focal plane of the lens 102. The mask 104 selects the light coming from a detection zone which is the image of the transparent parts of the mask 104. Having passed through the mask 104, the beam is then reflected by the mirror 105 and then passes through the lens 106, a focal plane of which is on the array 104. It then passes through the lens 107, a focal plane of which is coincident with a second focal plane of the lens 106. It is reflected by the mirrors 108 and 109 and then passes through the lens 110, a focal plane of which is coincident with the second focal plane of the lens 107. It is reflected by the image face 101(b) of the galvanometric mirror and exits the scanning device 120. It is then focused in the plane of a CCD sensor 114 by the lens 113. The lenses 102, 106, 107, 110 are identical. This embodiment is inspired by patent PCT/FR03/00699. An equivalent embodiment uses the scanner with 2 lenses and 4 mirrors which is described in patent PCT/FR03/00699. This embodiment corresponds to illumination in fluorescence, with illumination of the object by an excitation wavelength reflected by the dichroic mirror and detection of an emission wavelength passing through the dichroic mirror. Improved results may be obtained by adding a monochromator filter in front of the sensor. The embodiment can be adapted to multipoint laser illumination by replacing the illumination beam FE which reaches the mask 121 with a laser beam and by replacing the mask 121 with an array of microlenses located in a suitable plane so as to generate a plurality of beams focused on a plurality of points in the plane of the mask 121. It can be adapted in a similar manner to single-point illumination, which then requires bidirectional scanning with the aid of the galvanometric mirror. It can be adapted to halogen illumination in reflection by replacing the illumination beam FE which reaches the mask 121 with a beam coming from a halogen lamp and by replacing the dichroic mirror 122 with a semitransparent mirror. By displacing the lens 124 or the mask 121 in the optical axis, it is possible to correct chromatic distortions induced by the microscope objective between the excitation wavelength and the emission wavelength.

Figure 2:
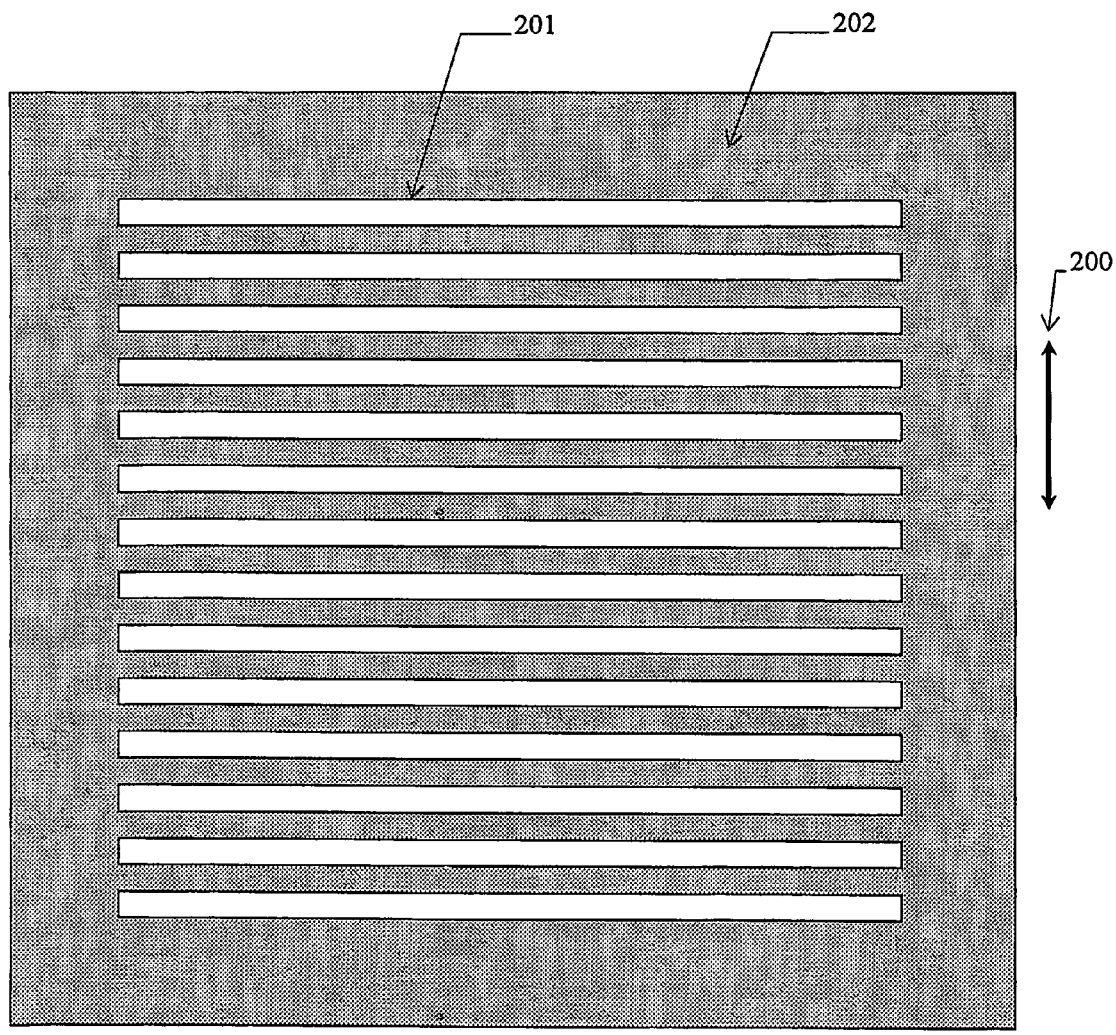
FIG. 2 shows a mask used in this embodiment.
Figure 3:
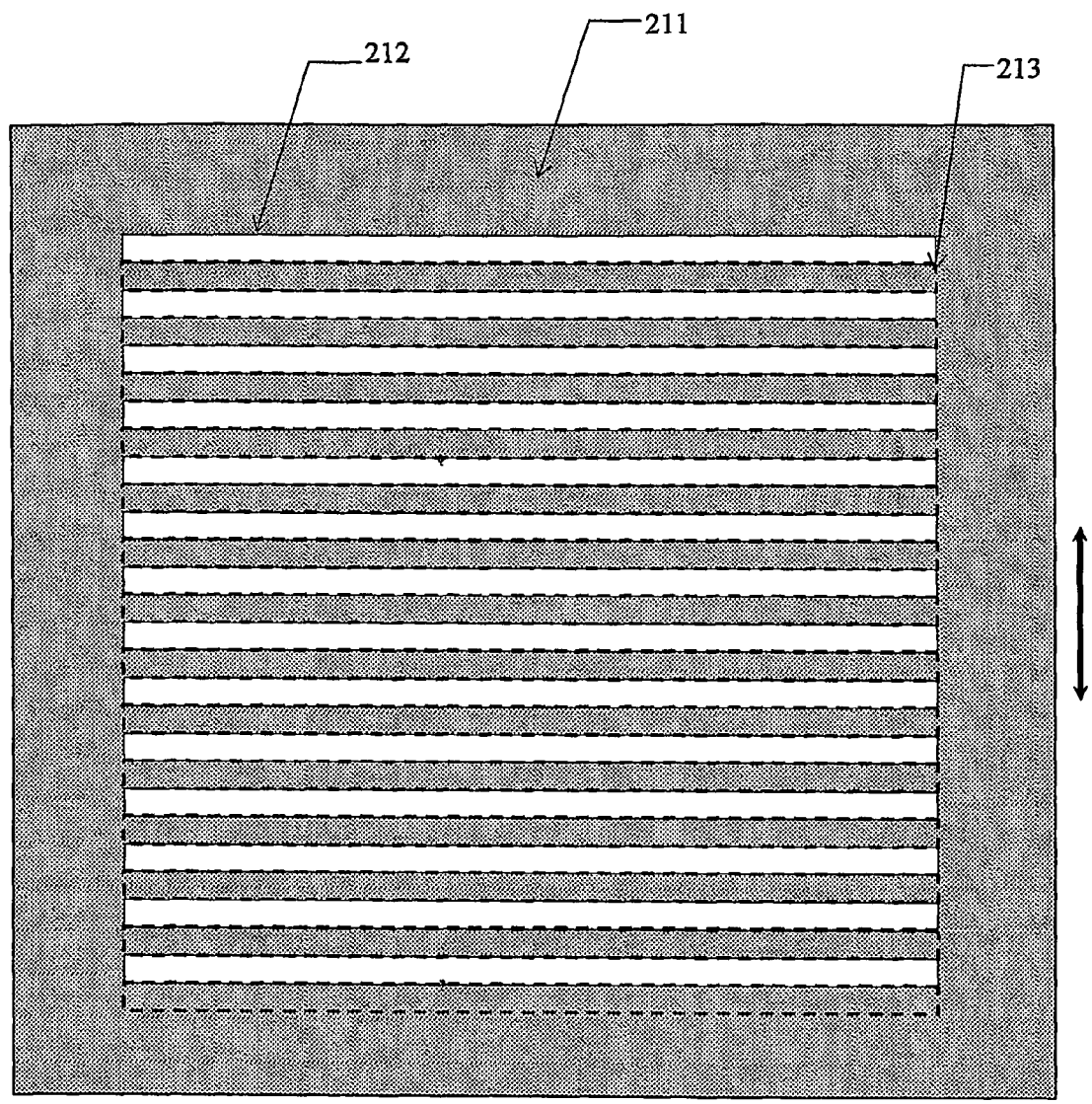
FIGS. 3 and 4 show the superposition of the geometric images of two masks of the same type, corresponding to two positions of these masks.
Figure 4:
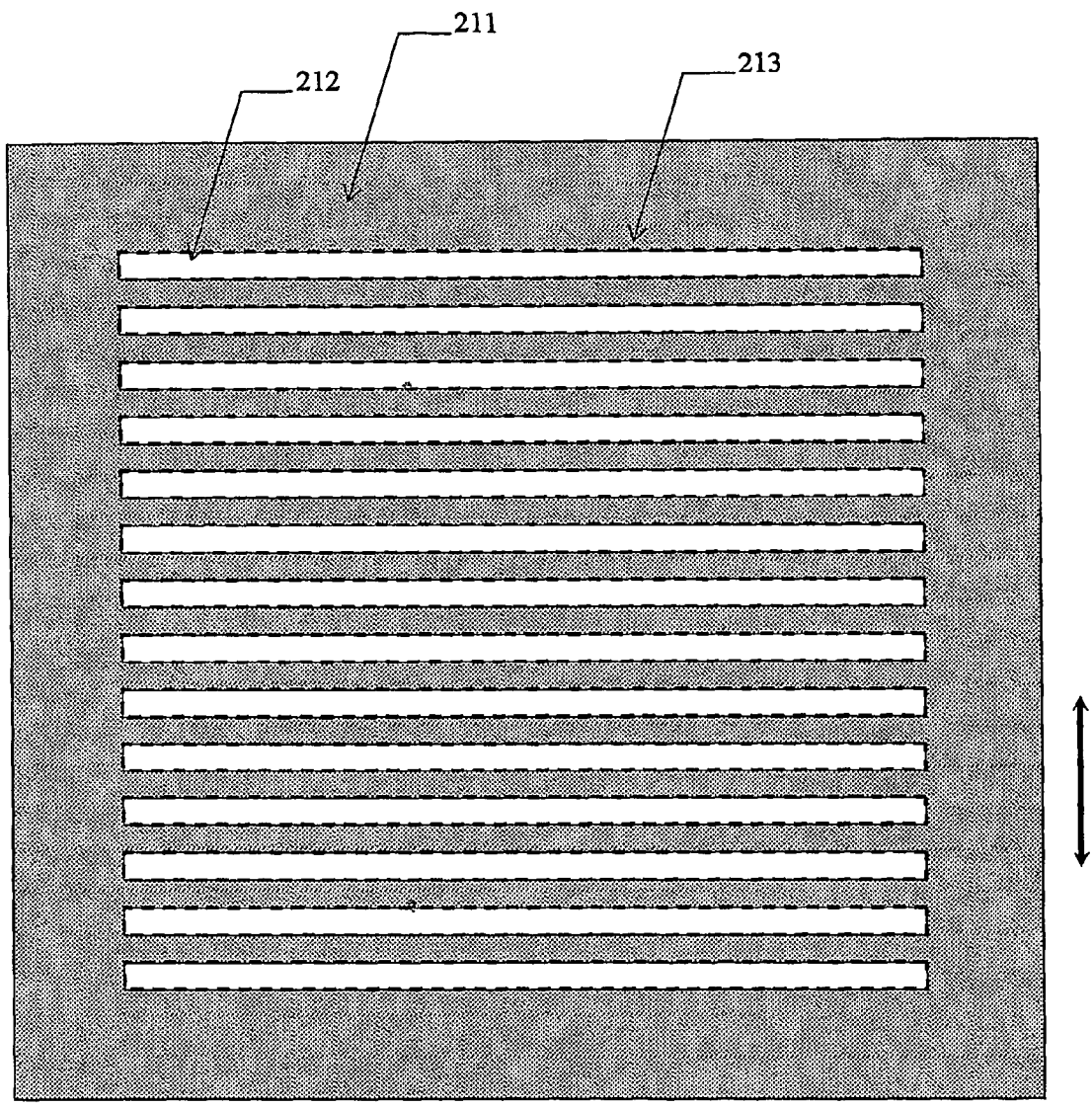

For example, the masks 121 and 104 may be of the type shown in FIG. 2, in which the arrow 200 represents the scanning direction. The mask of FIG. 2 is composed of transparent bands 201 on an opaque base 202. The first image is produced on the CCD sensor 114 when the illumination and detection zones are superposed as shown in FIG. 4, in which the light parts 212 represent the illumination zones (geometric image in the observed object of the mask 121) contrasting with the non-illuminated zones 211, and in which the dotted lines 213 represent the boundary of the detection zone (geometric image in the observed object of the mask 104). Between the acquisition of the first image and the acquisition of the second image, one of the masks 121 or 104 is moved in translation in such a way that, during the acquisition of the second image, the illumination and detection zones are not coincident, as shown in FIG. 3, in which the light parts 212 represent the illumination zone (geometric image of the mask 121) contrasting with the non-illuminated zones 211, and in which the dotted lines 213 represent the boundary of the detection zone (geometric image of the second mask 104). A resultant image can then be obtained by subtracting the first and second images from one another, each of said images being modified by a multiplier coefficient which can be adjusted empirically in order to obtain the best possible image quality and which in the present case is approximately equal to 1. A constant may be added to this image in order to prevent any negative values due to noise. Preferably, the distance between two bands of the mask is equal to the width of one band and is typically 20 to 60 microns for a ×100 microscope with a numerical aperture of 1.4. Typically, for this dimensioning of the band system, if the first image is given by the notation $I1[i,j]$ and the second is given by the notation $I2[i,j]$, it is possible to calculate the resultant $I1[i,j]-I2[i,j]$.

Figure 5:
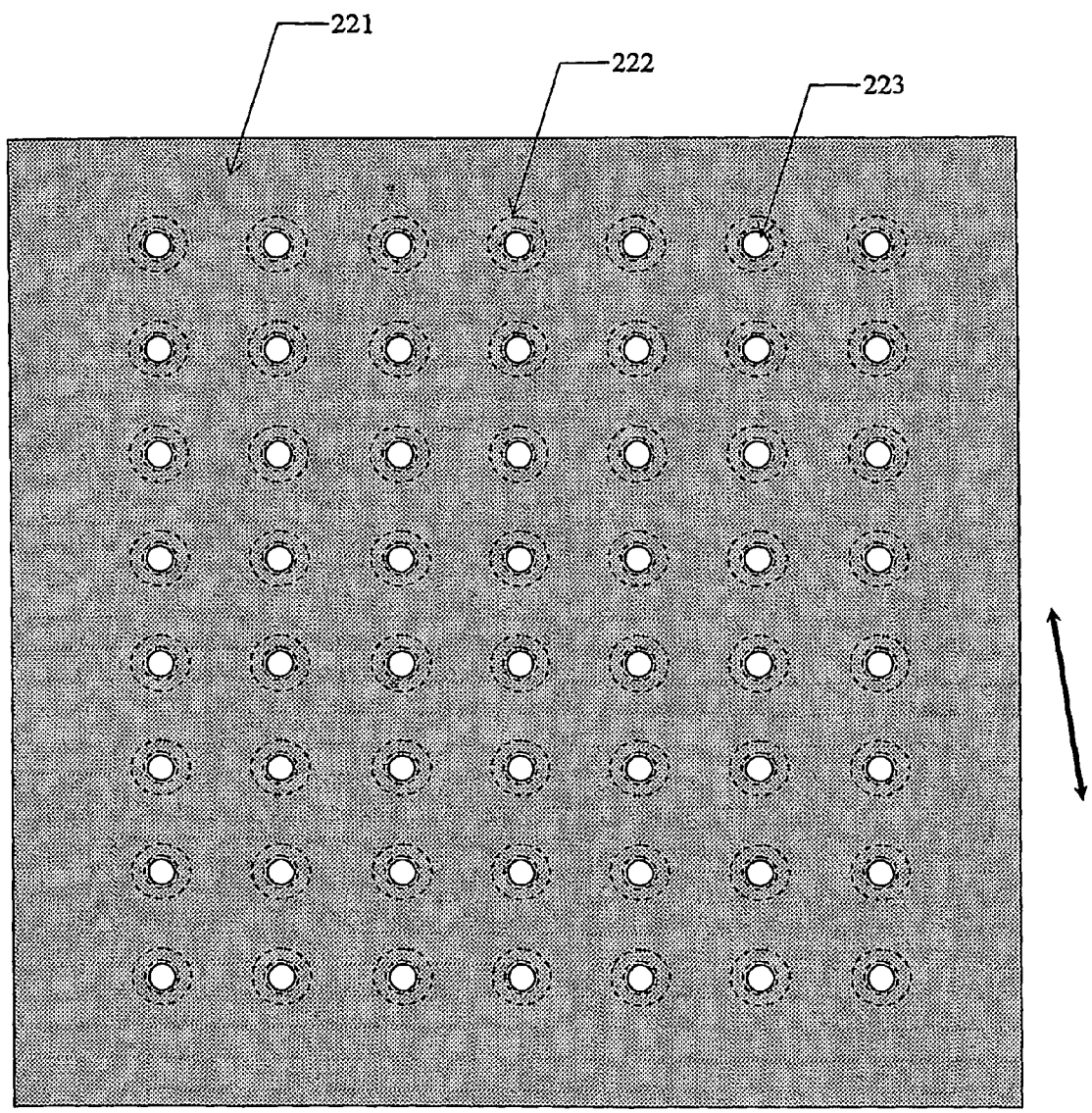
FIG. 5 shows the superposition of the geometric images of the masks of FIGS. 6 and 7.
Figure 6:
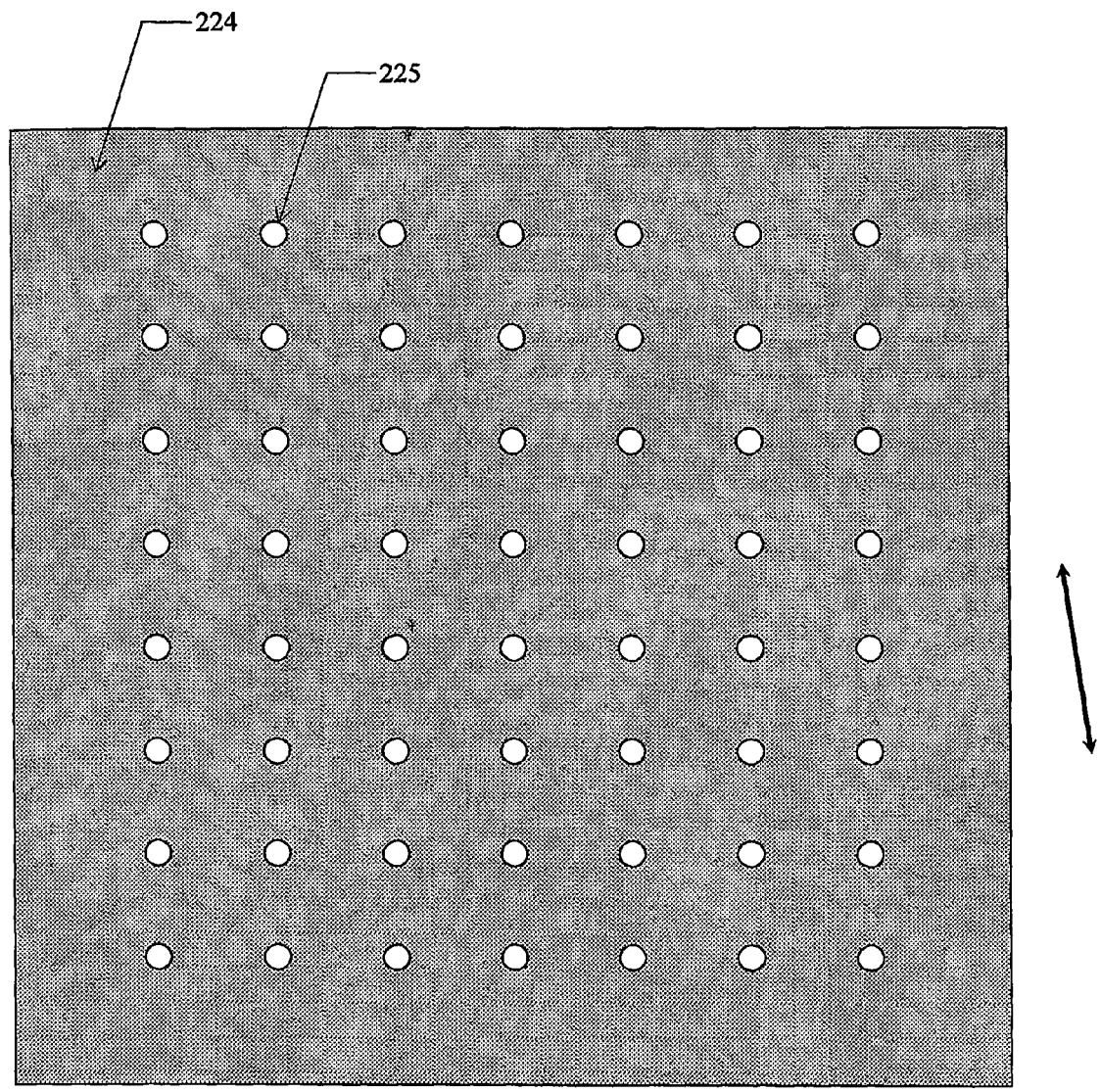
Figure 7:
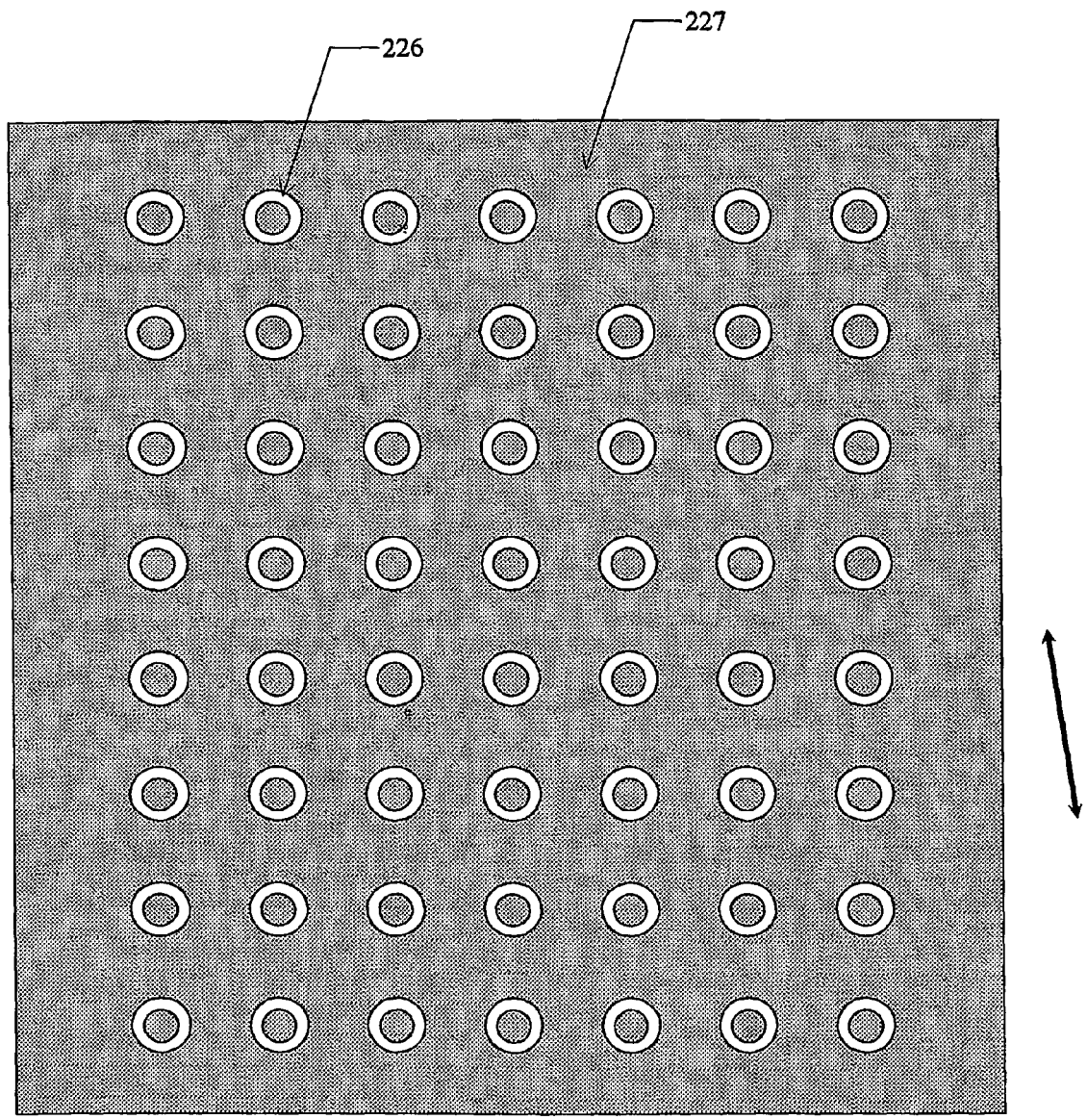
Figure 8:
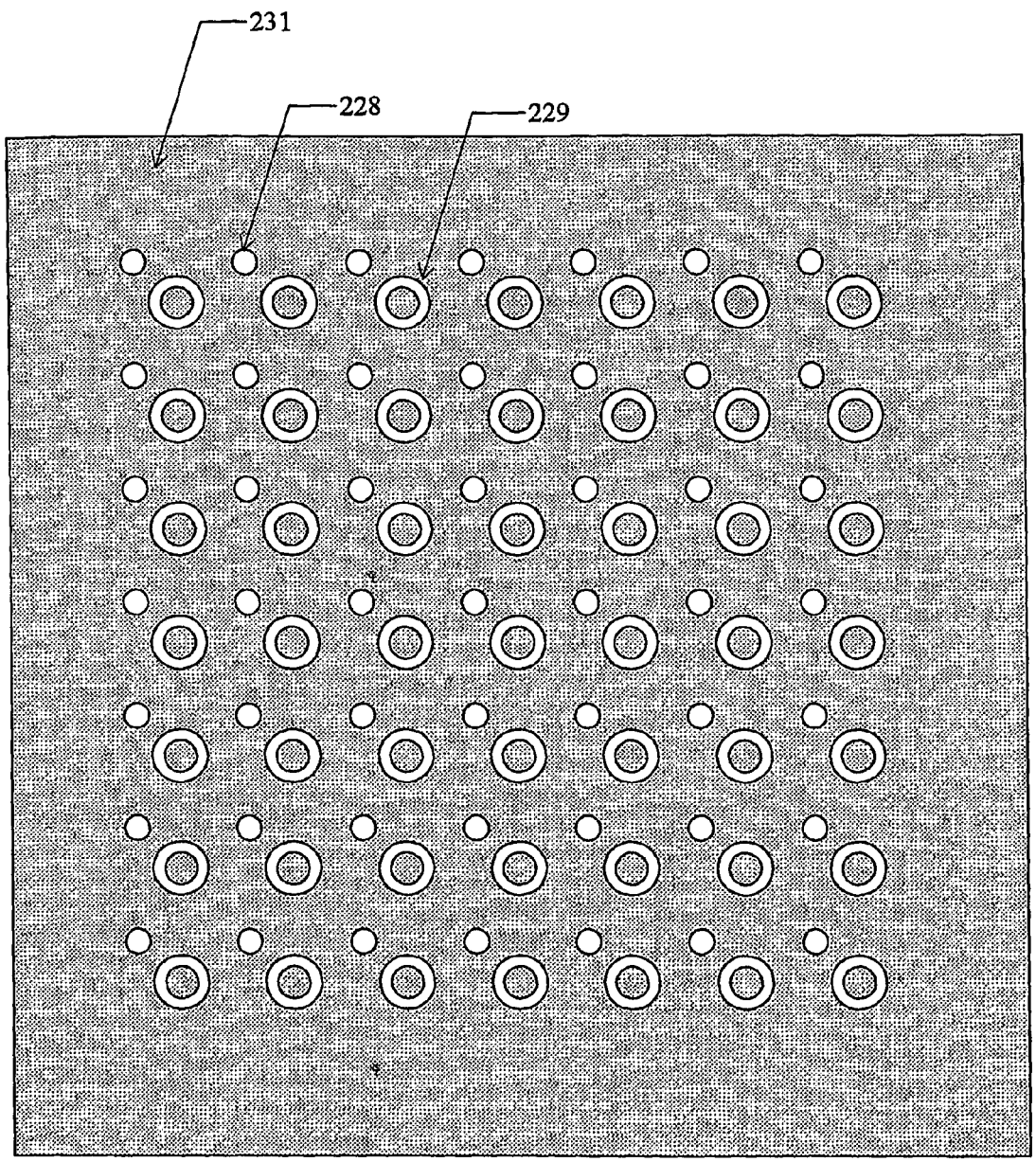
FIGS. 8 and 9 show two lithographic plates, the superposition of which makes it possible to obtain the masks of FIGS. 6 and 7.
Figure 9:
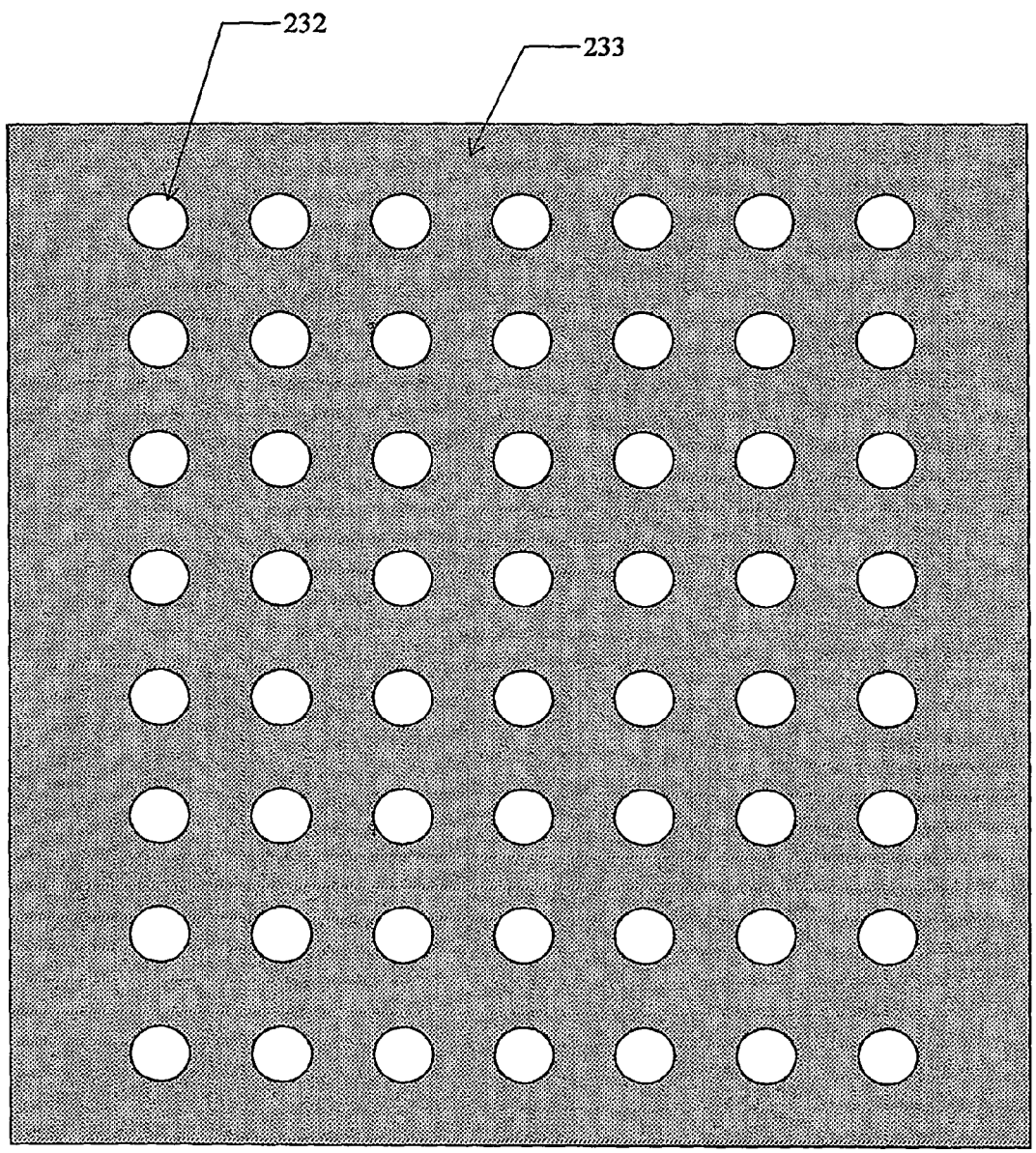

The masks 121 and 104 may also be of the type shown in FIGS. 7 and 6. When obtaining the first image, these two masks are formed by disks 225 on an opaque base 224 (FIG. 6), the diameter of which may be close to that of the Airy disk or of the Airy half-disk depending on the desired precision, and the illumination and detection zones, formed of microdisks, are exactly superposed. When obtaining the second image, the mask 121 remains unchanged and the mask 104 is formed of rings 226 on an opaque base (FIG. 7), the illumination zone and the detection zone being superposed as shown in FIG. 5. In this figure, the light zone 223 represents the boundary of the illumination zone and the dotted lines 222 delimit the detection zone, in the form of a ring. The thickness of the rings may be for example half an Airy diameter. The resultant image is obtained in the same way as before. In order to change the mask between the first and the second image, use is made for example of a mask formed of two lithographic plates which are placed one against the other as indicated in patent PCT/FR02/04382. One of the plates is of the type shown in FIG. 8 and the other is of the type shown in FIG. 9. By sliding these plates one against the other, it is possible to superpose alternately a hole 228 or a ring 229 on a hole 232, and thus to alternate between the mask shown in FIG. 6 and that shown in FIG. 7.

When the system is adapted to laser illumination, it is possible to retain the mask 104 shown in FIGS. 6 and 7. The mask 121 is simply replaced with an array of microlenses which has an equivalent effect, the focal plane of the microlenses being in the focal plane of the lens 124.

Second Embodiment (Preferred Embodiment)

Figure 10:
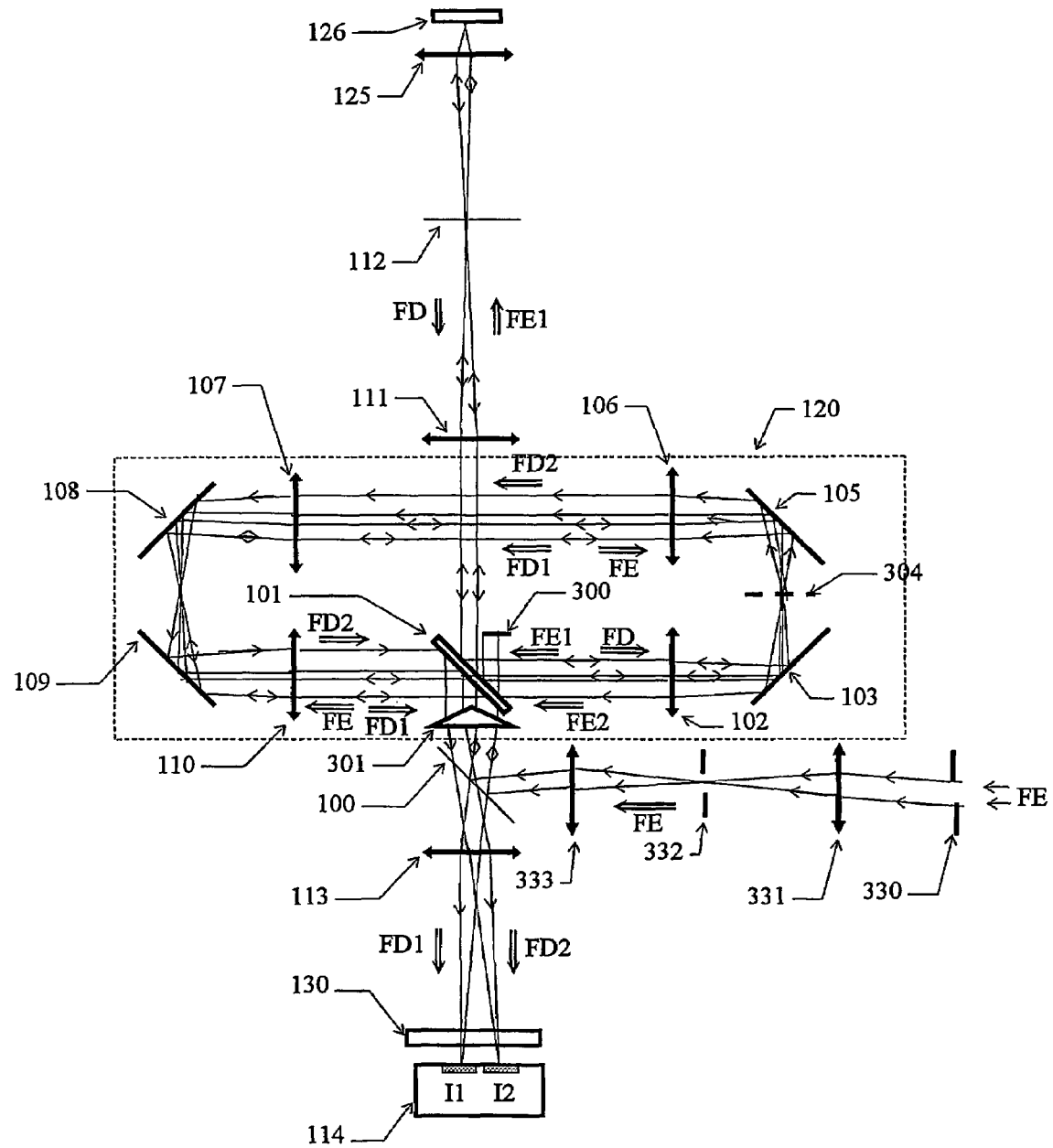
FIG. 10 shows a modified scanning system for allowing real-time acquisition under optimal luminosity conditions.
Figure 11:
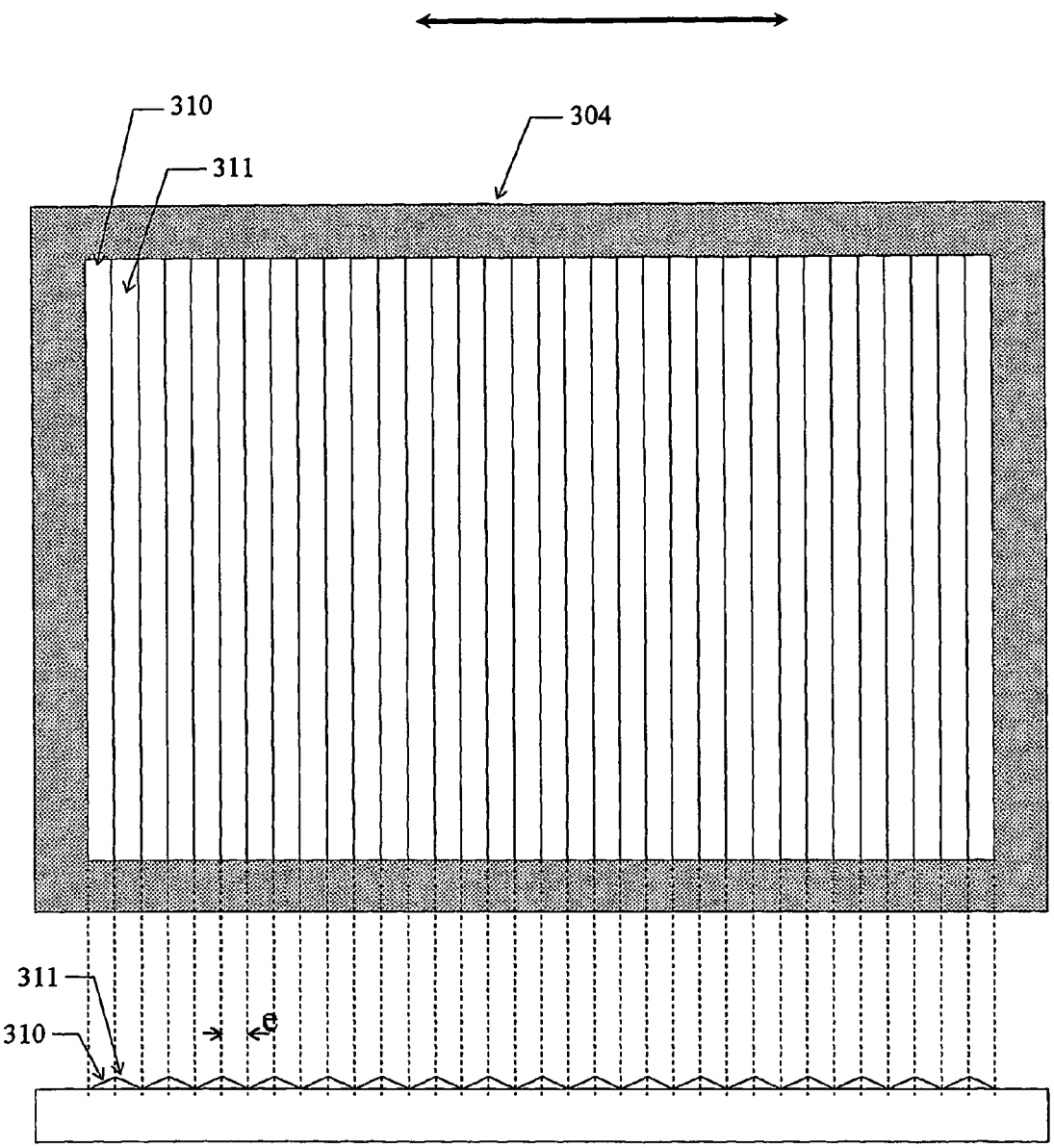
FIG. 11 shows the microprism mask used with the device of FIG. 10.
Figure 12:
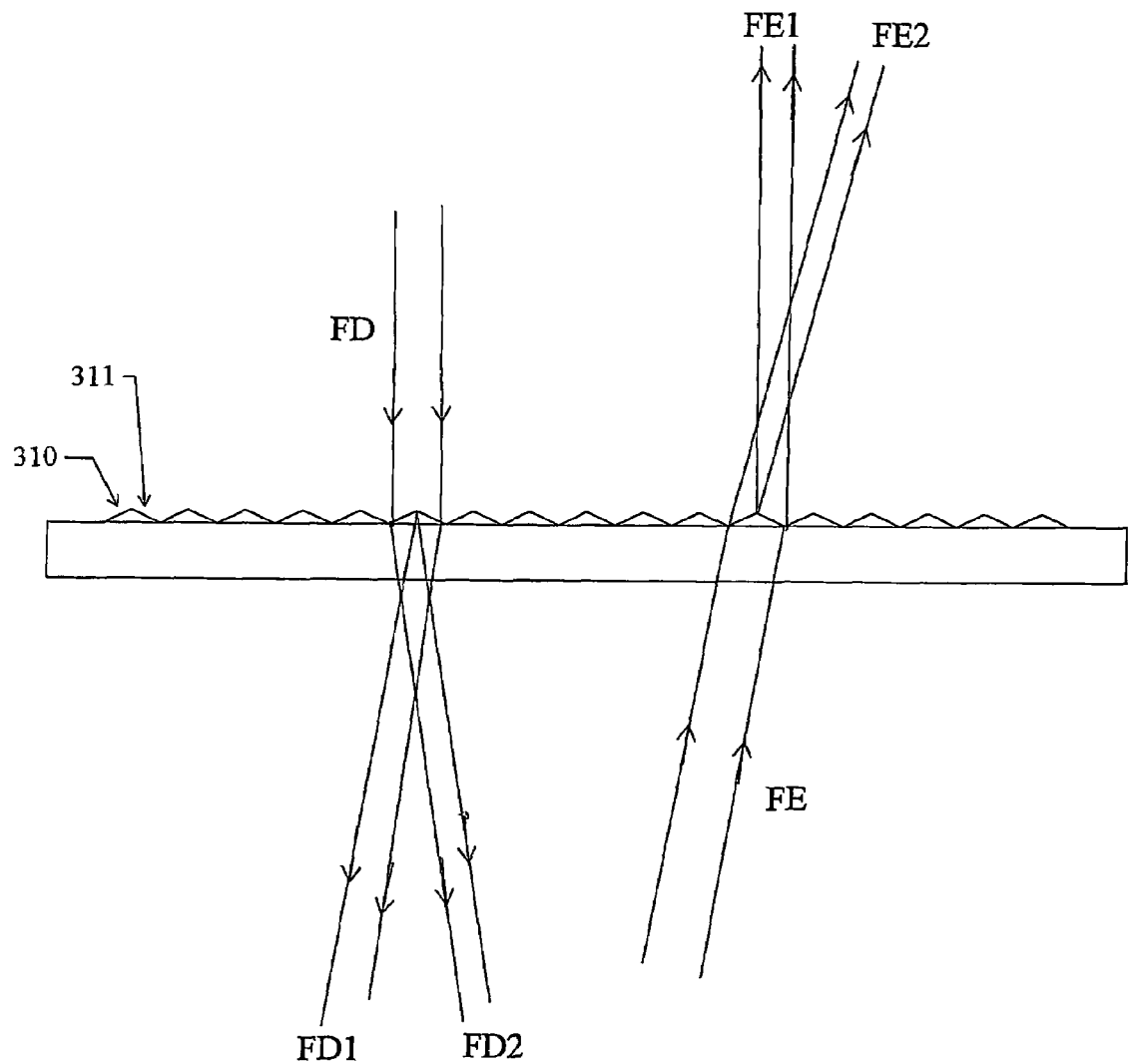
FIG. 12 illustrates the functioning of this mask.

The previous embodiment has the disadvantage of not making optimal use of the available light intensity due to the fact that the first and the second image are not obtained simultaneously. The present embodiment, which is shown in FIG. 10, solves this problem. The illumination beam FE is screened by an aperture diaphragm 330, passes through the lens 331, is screened by a field diaphragm 332 and passes through the lens 333 before reaching the dichroic mirror 100. After reflection by the dichroic mirror 100, it reaches the right-hand half of the prism 301. The aperture diaphragm 330, located in a plane conjugate to the zone in which the prism 301 and the galvanometric mirror is located, has the function of limiting the extension of the illumination beam over the prism 301. The field diaphragm 332 limits the aperture of the beam reaching the prism 301. After having passed through the prism 301, the beam FE is reflected by the galvanometric mirror 101. After having passed through the lenses 110, 107, 106, it reaches the mask 304. The mask 304 is shown in FIG. 11. It is composed of a glass plate on which microprisms are formed, for example 310 and 311. As in the other drawings, the scanning direction is indicated by the thick double-headed arrow. FIG. 12 illustrates the functioning of these microprisms. The illumination beam FE striking a pair of prisms is divided into a beam FE1 and a beam FE2. The beam FE2, after having passed through the lens 102 and then having been reflected by the mirror 103 and the face (a) of the galvanometric mirror 101, is stopped by the aperture diaphragm 300. The beam FE1, after reflection by the mirror 103 and the face (a) of the galvanometric mirror 101, passes through the lens 111 and is directed toward the intermediate plane 112 and then toward the object to be observed 126. Consequently, the object to be observed is illuminated by an illumination zone in the form of a grid, the microprisms oriented like 311 generating light bands (illumination zone) and the microprisms oriented like 310 generating dark bands due to the fact that the beam FE2 coming from these microprisms is stopped by the aperture diaphragm 300. The illumination zone scans the observed object when the galvanometric mirror is displaced.

Figure 13:
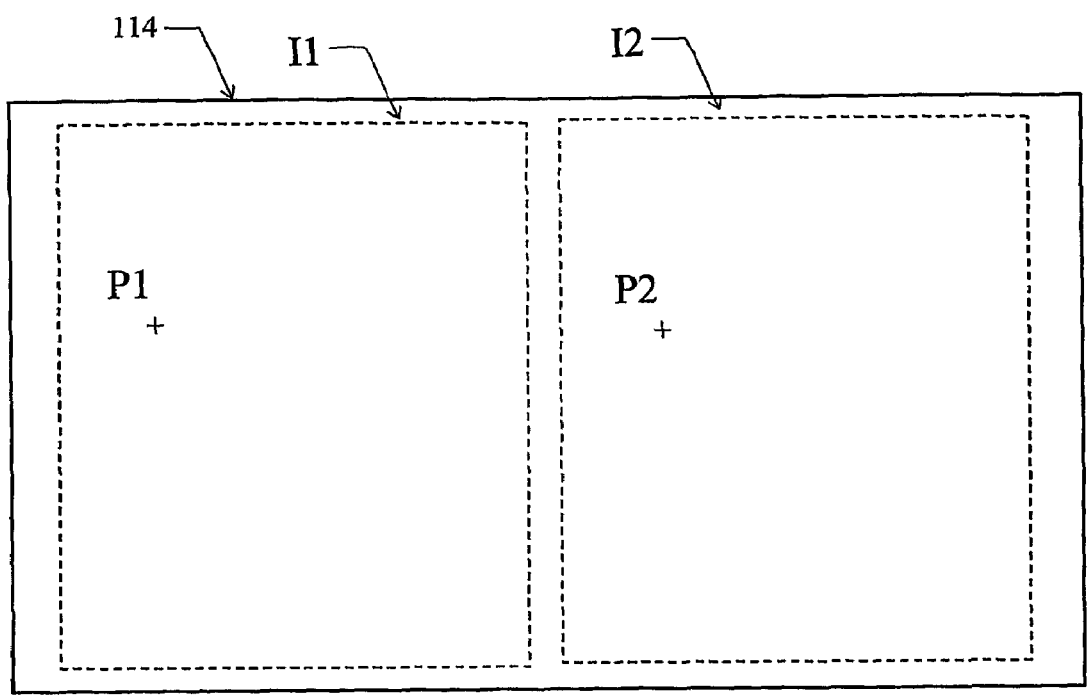
FIG. 13 illustrates the simultaneous formation of two images on the sensor.

The beam FD coming back from the observed object once again reaches the mask 304. As shown in FIG. 12, the beam FD coming from the observed object is divided by the microprisms into a first beam FD1 and a second beam FD2, these beams differing from one another in terms of their orientation. These two beams then come back to the face (b) of the galvanometric mirror 101 after having passed through the lenses 106, 107, 110. Close to the face (b) of the galvanometric mirror 101, the two beams are spatially separated. Each of the two beams passes through a different half-prism (the two halves of the prism 301), which modifies the orientation of said beams. After having passed through the lens 113, the two beams reach different points on the sensor 114. Two images I1 and I2 are formed in the plane of the CCD sensor 114, the extension of which images is shown in FIG. 13. The size of these images is determined by the field diaphragm 332, which therefore must preferably be rectangular. The first image (I1) is obtained from the first beam, which has passed back through the microprisms orientated like 311 that have already been passed through by the illumination beam. Said first image is therefore obtained from a detection zone that is coincident with the illumination zone. The second image (I2) is obtained from the second beam. This second beam has passed back through the microprisms orientated like 310 which, in association with the diaphragm 300, had stopped the illumination beam. Said second image is therefore obtained from a detection zone that is complementary to the illumination zone. Each point on the observed object has two image points, for example P1 and P2, one of which is located on the first image I1 and the other of which is located on the second image I2. The vector P1 P2 is not dependent on the point of the observed object. A resultant image is formed by calculating, for each point on the observed object, the difference between the values acquired on the sensor for its two image points P1 and P2 after the galvanometric mirror has scanned the image of the mask on the observed object. Before calculating the difference, it is possible to multiply each image by a multiplicative coefficient which has the function of optimally adjusting the result so as to obtain the best possible image.

The dimensioning of the grid may be carried out in the same way as before, namely that the width e of a microprism, shown in FIG. 11, and corresponding to the width of a band, may be for example 21 microns. The width of a microprism may also be increased so as to make the system less resolvent but more robust against distortion, in particular chromatic distortion.

Figure 14:
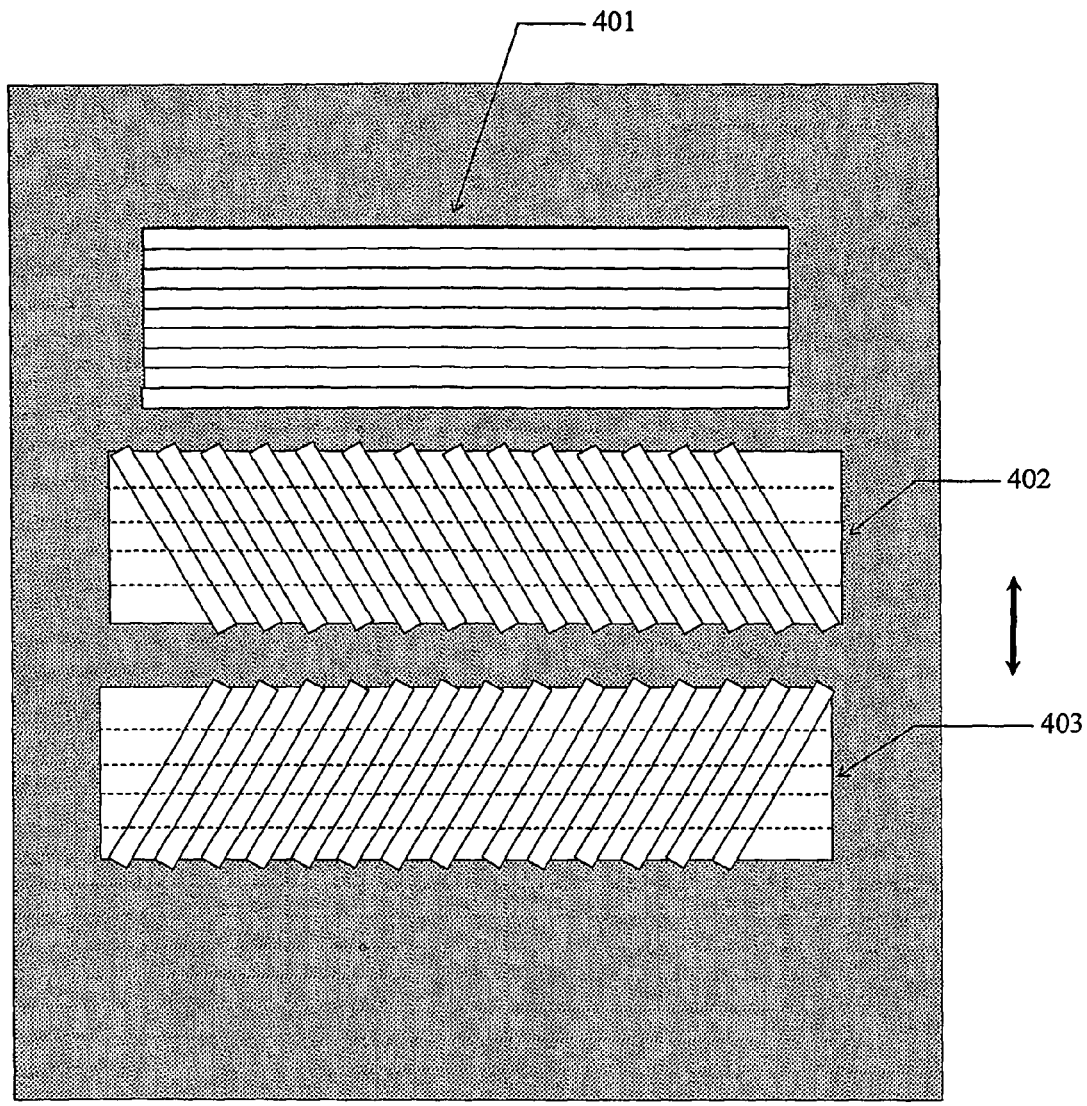
FIG. 14 shows an improved microprism mask for better isotropy of the image.
Figure 15:
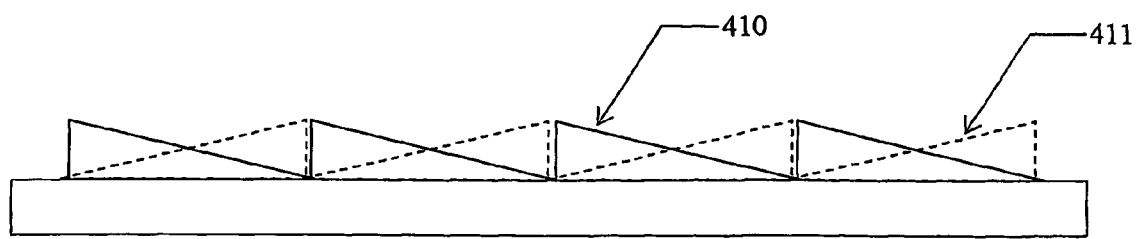
FIG. 15 shows a side view of this improved mask.

One variant of the mask is shown in FIG. 14. It makes it possible to make the resolution more isotropic. The bands shown correspond to the bands which filter the first and the second image. The array of bands 401 is identical to that shown in FIG. 11. The array of bands 402 is rotated through 60 degrees. However, it has to send the light corresponding to the first image and to the second image in the same direction as the array of bands 401. This is why the slope of the prisms forming the various bands of the array 402 is not at a maximum in the direction orthogonal to the direction of the bands of the array 402 but rather in the direction orthogonal to the direction of the bands of the array 401. The dotted lines passing through the array of bands 401 indicate fracture lines on which the height of each prism is brought back to zero, designed to prevent the prisms from becoming too thick. FIG. 15 shows a view in the direction of these fracture lines. In this direction, the prisms 410 corresponding to one array of bands and the prisms 411 corresponding to the array of alternating bands can be seen. During acquisition of the images, the illuminated zone on the mask passes through the three arrays 401, 402 and 403.

Figure 16:
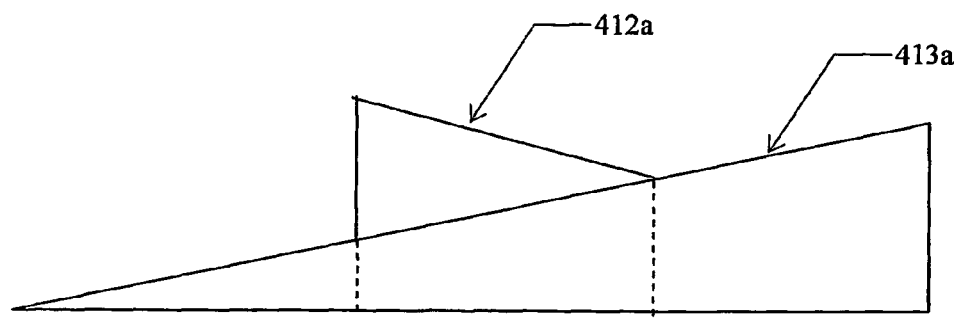
FIG. 16 shows a side view of a filtering part of the mask of FIG. 18.
Figure 17:
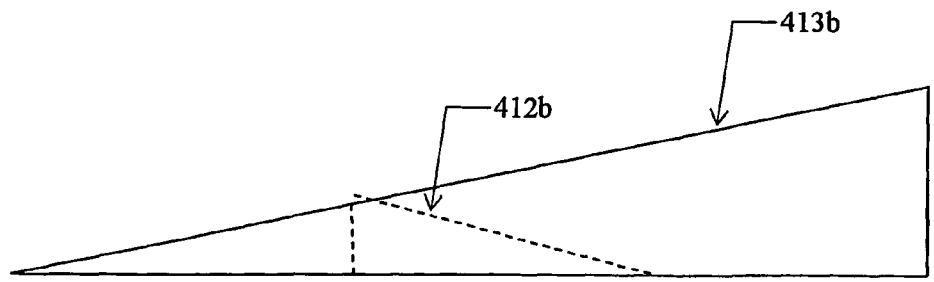
FIG. 17 shows, in a different embodiment, a side view of the same filtering part.
Figure 18:
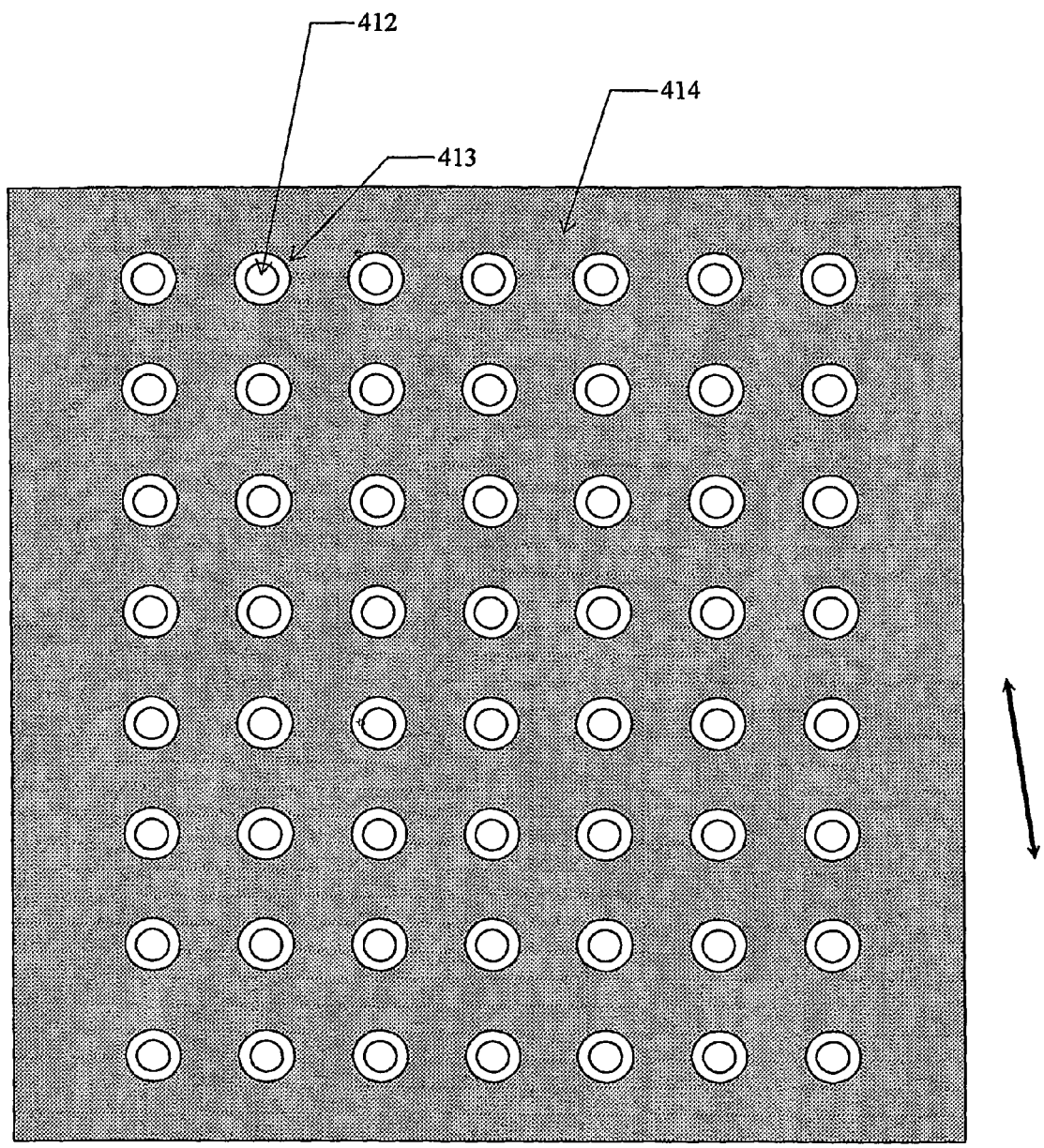
FIG. 18 shows a mask with microprisms organized in the form of separate disks and rings.

The system can also be implemented with a mask having a functionality similar to that of the masks of FIGS. 5 to 9. FIG. 18 shows such a mask. Each point on this mask comprises a microprism of circular cross section 412 and a microprism of annular cross section 413. These microprisms are shown in a side view in FIG. 16 (412a and 413a) and in FIG. 17 (412b and 413b), corresponding to slightly different technical embodiments. Of course, all of the circular microprisms have their slope oriented in the same direction which, given the configuration employed, corresponds to the scanning direction, and all of the annular microprisms have their slope oriented in the same direction but the other way round.

Figure 19:
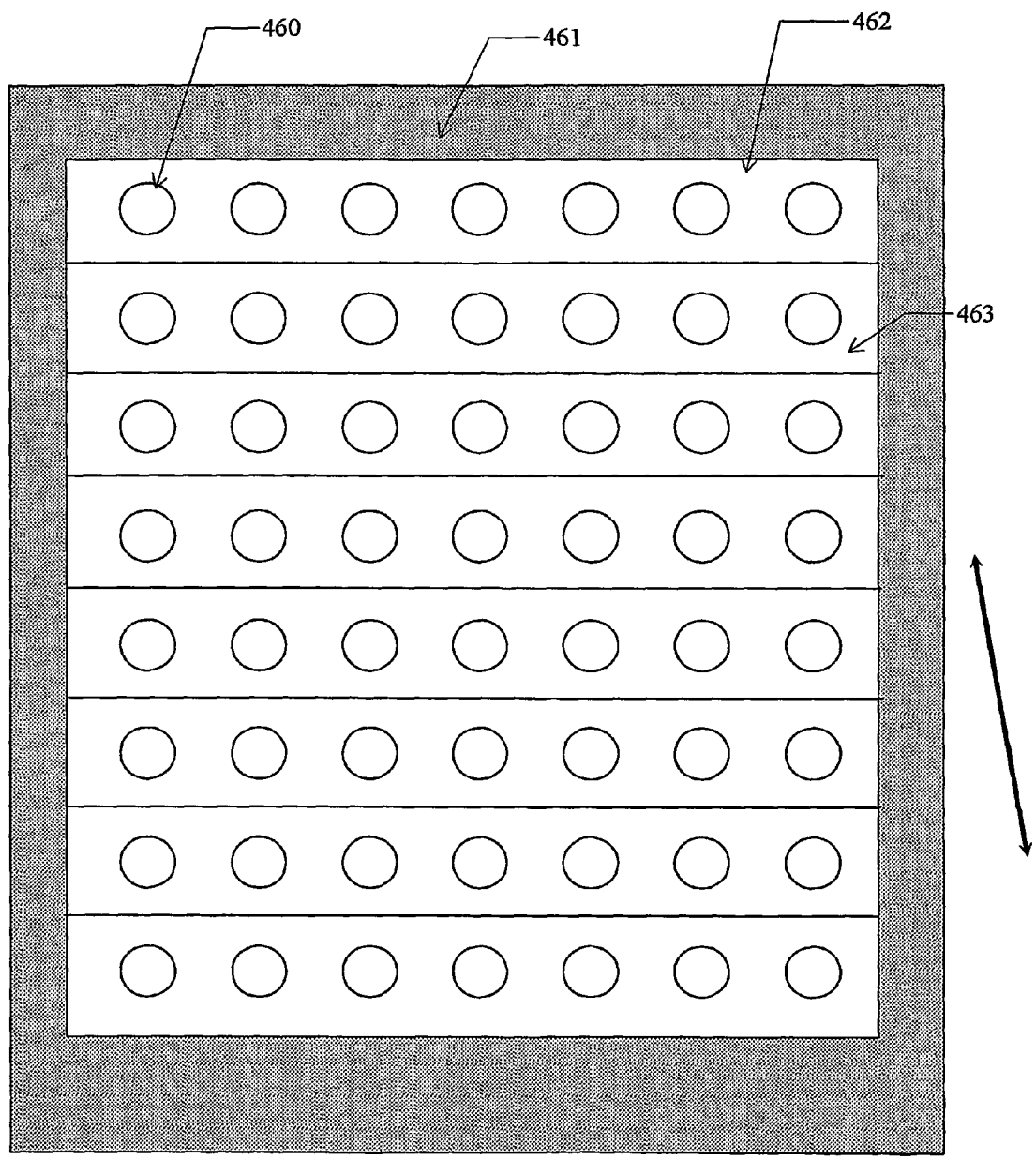
FIG. 19 shows a mask with microprisms organized in the form of disks included in bands.

However, particularly when the illumination zone consists of a set of disks that are close together, it is preferable if the detection zone for obtaining the second image is complementary to the detection zone for obtaining the first image. FIG. 19 shows the corresponding mask. It comprises, on an absorbent frame 461, circular microprisms, for example 460, all having a slope in the same direction and microprisms in the form of bands 462 or 463 which are interrupted by the circular microprisms and all have a slope the opposite way round to that of the circular microdisks. It should be noted that, if the microprisms in the form of bands have a slope oriented perpendicularly to the direction of the bands and therefore, in the case shown in the figure, at an angle to the scanning direction, then it is preferable to slightly rotate the prism 301 and the sensor 114 about the optical axis so that the prism 301 separates two zones which are no longer symmetrical with respect to a plane orthogonal to the figure but rather with respect to a plane which is also at an angle.

Figure 20:
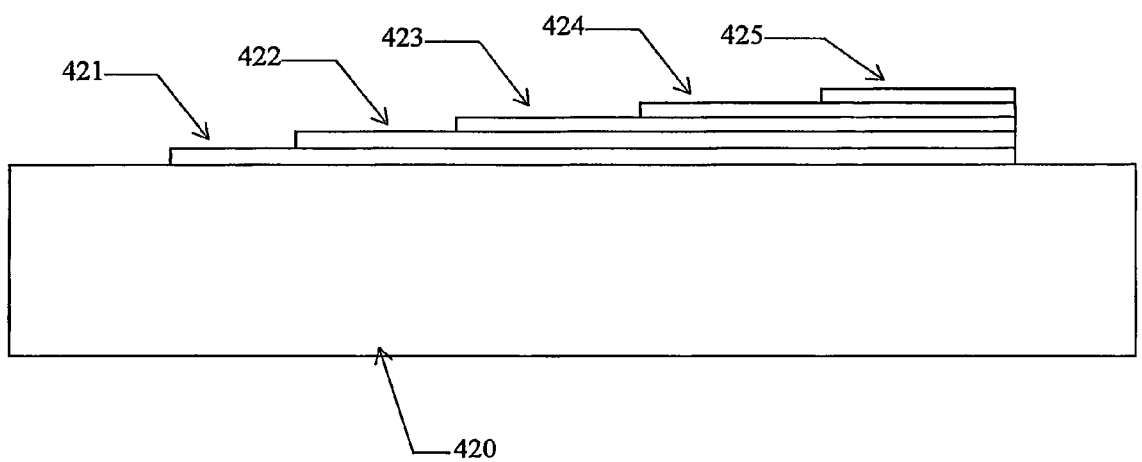
FIG. 20 shows one embodiment of the microprisms.

The microprisms may be produced by diamond machining techniques followed by molding. The microprisms may also be produced by lithography if their slope is small and their width is reasonable. They are then approximated by a succession of dielectric layers as shown in FIG. 20. A microprism is produced on a substrate 420 by depositing a number of layers 421 to 425 by lithography. It is also possible to produce a mold by lithography using metal layers, and then to mold the array of microprisms in a polymer.

This embodiment is particularly advantageous since it makes it possible to obtain images in real time, under optimal conditions of use of the information.

Although it has been shown in a configuration in which the microprism mask is passed through both by the illumination beam and by the beam coming from the observed object, this embodiment can also be adapted to a configuration similar to the first embodiment, in which the illumination beam does not pass through the microprism mask, having already been filtered by a conventional mask arranged on the illumination line. In this case, the illumination beam FE is unique (it is therefore not necessary to provide a diaphragm 300) and is processed as shown in FIG. 1. The beam coming back from the object reaches the microprism mask and is therefore processed as shown in FIG. 10. The advantage of a configuration similar to the first embodiment is that the difference in chromatic distortion between an excitation wavelength of the fluorescence and a detection wavelength of the fluorescence can be compensated by a displacement, in the optical axis, of the mask arranged on the illumination line or of the lens 124 shown in FIG. 1.

Variants of the Scanning Device

The system can also be used with other scanning devices.

For example, it is possible to produce the microprism mask on a Nipkow disk. In FIG. 10, it is sufficient to replace the fixed mask with a mask mounted on a rotating disk and to replace the galvanometric mirror with a fixed mirror, in order to obtain a functional system. However, the scanning characteristics (circular trajectory) tend to degrade the image. The system can be "unfolded" since the galvanometric mirror is of no use, but it remains necessary to generate suitable planes for the various diaphragms and masks, and the system is therefore not significantly simplified.

Instead of a Nipkow disk, it is possible to displace the microprisms by means of a device which allows translation (stepping motor for example). This solution avoids the problems associated with the circular trajectory. The displacement may be very short (at the minimum the width of a microprism, i.e. a few tens of microns), which permits rapid scanning. The translation device may also generate an oscillatory-type displacement of the microprisms if the latter are mounted with the aid of springs having suitable characteristics.

The system may also be used with scanning devices of the type described in patent PCT/FR01/02890, for example in FIG. 22 of said patent, and which involve the mask operating in reflection. In this case, the bands, disks or rings of the masks are produced by depositing a reflective layer on a transparent base for the first two embodiments or by producing prisms covered with a reflective layer for the third embodiment. In the case of producing the prisms by lithography, this solution simplifies the embodiment since the deposits can all be made of metal (the prisms reflect the light instead of transmitting it). In general, the microprisms may therefore be either prisms operating in reflection or prisms operating in transmission. In the case where the images are obtained successively, it is difficult to use a Nipkow disk since the latter does not make it possible to have a detection zone that is distinct from the illumination zone, unless said disk is equipped with an array of holes made of two superposed plates which make it possible to alternate for example holes in the form of disks and holes in the form of rings. This is difficult due to the fact that the disk permanently rotates.

Techniques for Determining the Multiplier Coefficient

In general, combining of the first image and of the second image is achieved by subtracting these two images from one another, said images being modified by a multiplier coefficient. In fact, just one coefficient has to be determined if the general level of luminosity of the image is not taken into account. The superposition of two images $I1[i,j]$ and $I2[i,j]$, in which i and j are the integer coordinates of a point on the sensor in the plane, is then calculated as $$IR[i,j]=C1*(I1[i,j]-C2*I2[i,j]-C3)$$

where $C3=Min(I1[i,j]-C2*I2[i,j])$ and $C1=256/Max(I1[i,j]-C2*I2[i,j]-C3)$ in the case for example of a display on 256 gray levels, the symbol * representing the multiplication.

It is possible to write a program which displays the resultant image IR[i,j] as a function of the multiplier coefficient C2 and comprises an adjustment bar which makes it possible to gradually vary this coefficient between two extreme values. By varying C2 and by observing the resultant image, it is indeed possible to determine the value of C2 which generates the clearest and most contrasted resultant image, in which the elements outside the focusing plane are best eliminated. Once this coefficient C2 has been determined for a given imaging system, it usually remains independent of the sample observed.

It is also possible to determine the coefficient C2 by means of numerical calculus which aims to minimize the entropy of the resultant IR[i,j]. For example, the entropy of IR[i,j] is calculated for a set of values of C2 and the value corresponding to the minimum entropy is selected. The entropy is calculated as the sum over the set of indices i,j of $-IR[i,j]*\log(IR[i,j]/256)$.

Choice of Illumination and Detection Zones

It is possible to acquire a first image, known as the "pseudo confocal" image I1[i,j], for which the illumination zone and the detection zone are coincident. It is possible to acquire a second image, known as the "complementary" image I2[i,j], for which the detection zone is complementary to the illumination zone, the latter itself remaining unchanged. The "non-confocal" image is then $IN[i,j]=I1[i,j]+I2[i,j]$. The image $I1[i,j]$ may be written $I1[i,j]=K1*IN[i,j]+K2*IC[i,j]$, in which $IC[i,j]$ is a "pure" confocal image, that is to say its luminosity does not increase when the thickness of the fluorescent zone increases. K1 and K2 are constants which depend on the exact configuration of the illumination and detection zones for the acquisition of the two images. It is therefore possible to write $IC[i,j]=1/K2*I1[i,j]-K1/K2*IN[i,j]$ or $IC[i,j]=(1-K1)/K2*I1[i,j]-K1/K2*I2[i,j]$. The second formula gives the confocal image as a function of the complementary image and of the pseudo-confocal image. If the pseudo-confocal image and the non-confocal image are acquired in order to calculate the confocal image, a loss is made in terms of the signal-to-noise ratio. If use is made of non-complementary zones, a partially confocal image is subtracted which may allow a more complete elimination of low frequencies but which is in general not the desired effect, and it is therefore preferable to use complementary zones.

INDUSTRIAL APPLICATIONS

The present imaging device can be used in microscopy for the imaging of biological samples or of materials.

The invention claimed is:

1. An imaging device comprising:
means for illuminating at least one illumination point on an observed zone of an observed plane by means of an illumination light beam,
means for selecting, in the light coming from the observed plane, the light coming from said illumination point,
means for selecting, in the light coming from the observed plane, the light coming from a band surrounding said illumination point,
means for forming an image of said illumination point from the selected light coming from said illumination point and forming an image of said band from the selected light coming from said band,
a scanning system arranged so as to simultaneously displace said illumination point on the observed zone and the image of said illumination point, in order to scan an observed zone and to form a first image of the observed zone, the scanning system is further arranged so as to simultaneously displace said illumination point and the image of said band, in order to form a second image of the observed zone from the selected light coming from said band,
sensor system operatively configured to detect the first image and the second image, and
means for combining the first and second images of the observed zone to form a third image of the observed zone.

2. The device as claimed in claim 1 wherein said means for combining said first and second images is operatively configured to determine the difference between the first image modified by a first multiplier coefficient and the second image modified by a second multiplier coefficient.

3. The device as claimed in claim 1 wherein said band comprises a ring that is concentric to said illumination points.

4. The device as claimed in claim 1 further comprising a plurality of illumination points and a plurality of bands, each of said bands surrounding a corresponding illumination point.

5. The device as claimed in claim 4 wherein the means for illuminating the plurality of illumination points comprises an array of microlenses which separate a laser beam into a plurality of subbeams, each focused on one illumination point.

6. The device as claimed in claim 1 wherein the illumination point comprises a single illumination point, and the means for illuminating the illumination point comprises a lens which focuses a laser beam on the illumination point.

7. The device as claimed in claim 1-wherein the means for selecting the light consists of the superposition of a first opaque plate comprising at least one transparent disk and of a second opaque plate comprising at least one transparent disk and at least one transparent ring, as well as means for moving the second plate in translation with respect to the first plate, so as to bring the disk of the second plate opposite the disk of the first plate during acquisition of the first image and so as to then bring the ring of the second plate opposite the disk of the first plate during acquisition of the second image.

8. The device as claimed in claim 4 wherein the means for selecting the light comprises a mask composed of microprisms that form a first beam by sending in a first direction the light coming from the illumination points and form a second beam by sending in a second direction the light coming from the bands the device further comprises means for forming the first image from the first beam, and means for forming the second image from the second beam.

9. The device as claimed in claim 8 further comprising:
an intermediate lens for sending the first and the second beam into a separation zone where they are spatially separated, and
at least one of: a prism and a mirror which is placed in the separation zone, in order to modify the direction of at least one of the first and second beams.

10. The device as claimed in claim 9 further comprising a lens which is simultaneously passed through by the first and the second beam after the separation zone, and which forms the first and the second image in two distinct zones of the same image plane.

11. The device as claimed in claim 8 further comprising:
a first aperture diaphragm which is passed through by the illumination light beam before reaching the mask composed of microprisms,
a second aperture diaphragm which is passed through by the illumination light beam coming from the mask and directed toward the observed object, and wherein the first aperture diaphragm is positioned such that the part of the illumination beam which reaches a zone of the mask which transmits said second beam is then stopped by the second aperture diaphragm, and such that the part of the illumination beam which reaches a zone of the mask which transmits said first beam then passes through the second aperture diaphragm.

12. The device as claimed in claim 1 wherein each means for selecting comprises fixed masks and the scanning system consists of a moveable mirror.

13. The device of claim 1 wherein the sensor system comprises one of: (i) a single sensor configured to detect both the first and second image, and (i) a first sensor configured to detect the first image and a second sensor configured to detect the second image.

14. An imaging method comprising steps of:
illuminating at least one illumination point on an observed zone of an observed plane,
selecting, in the light coming from the observed plane, the light coming from said illumination point,
forming an image of said illumination point from the selected light coming from said illumination point,
displacing said illumination point on the observed zone and simultaneously displacing the image of said illumination point, in order to scan an observed zone and form a first image of the observed zone,
detecting the first image,
selecting, in the light coming from the observed plane, the light coming from a band surrounding said illumination point,
forming an image of said band from the selected light coming from said band,
simultaneously displacing said illumination point and the image of said band, in order to form a second image of the observed zone from the selected light coming from said band,
detecting the second image, and
combining the first and second images of the observed zone to form a third image of the observed zone.

15. The method as claimed in claim 14 wherein said combining step comprises determining a difference between the first image modified by a first multiplier coefficient and the second image modified by a second multiplier coefficient.

16. The method as claimed in claim 14 wherein said band comprises a ring that is concentric to said illumination points.

17. The method as claimed in claim 3 wherein the illuminating step comprises illuminating a plurality of illumination points, each illumination point being surrounded by a corresponding band, and wherein the step of detecting the light coming from a band comprises detecting the light coming from each of the bands corresponding to each illumination point.

18. The device of claim 1, further comprising means to select, in the light coming from the observed plane, light having a different wavelength than the illumination light beam, to generate a fluorescence image.

19. The method of claim 14, wherein each step of selecting further selects light having a different wavelength than the wavelength of the light used for illuminating the observed plane, to generate a fluorescence image.

* * * * *